US011299060B2

(12) United States Patent
Kinomura

(10) Patent No.: US 11,299,060 B2
(45) Date of Patent: Apr. 12, 2022

(54) DISPLAY DEVICE FOR CHARGING SYSTEM AND DISPLAY METHOD FOR CHARGING SYSTEM

(71) Applicant: Toyota Jidosha Kabushiki Kaisha, Toyota (JP)

(72) Inventor: Shigeki Kinomura, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 124 days.

(21) Appl. No.: 16/800,426

(22) Filed: Feb. 25, 2020

(65) Prior Publication Data

US 2020/0282858 A1  Sep. 10, 2020

(30) Foreign Application Priority Data

Mar. 4, 2019  (JP) .............................. JP2019-038661

(51) Int. Cl.
*H02J 7/00* (2006.01)
*B60L 53/66* (2019.01)
*B60L 53/30* (2019.01)
*G06F 3/0482* (2013.01)

(52) U.S. Cl.
CPC ............. *B60L 53/66* (2019.02); *B60L 53/305* (2019.02); *G06F 3/0482* (2013.01); *H02J 7/00034* (2020.01); *H02J 7/0071* (2020.01); *B60L 2250/16* (2013.01); *H02J 2310/48* (2020.01)

(58) Field of Classification Search
CPC ...... B60L 53/66; H02J 7/0071; H02J 7/00034
USPC ........................................................ 320/108
See application file for complete search history.

(56) References Cited

U.S. PATENT DOCUMENTS

| | | | |
|---|---|---|---|
| 2011/0239116 A1* | 9/2011 | Turner | B60L 53/305 715/705 |
| 2016/0193932 A1* | 7/2016 | Vaghefinazari | B60L 53/665 320/109 |
| 2016/0276842 A1* | 9/2016 | Shizuno | B60L 58/12 |
| 2017/0217326 A1* | 8/2017 | Nishi | B60L 53/305 |
| 2019/0130451 A1* | 5/2019 | Logvinov | G06Q 50/06 |
| 2019/0210468 A1* | 7/2019 | Wittl | H02J 7/00714 |
| 2020/0198487 A1* | 6/2020 | Muramatsu | G06Q 30/04 |
| 2021/0252991 A1* | 8/2021 | Pizzurro | B60L 53/16 |

FOREIGN PATENT DOCUMENTS

| | | |
|---|---|---|
| JP | 2012-208685 A | 10/2012 |
| JP | 2013-242795 A | 12/2013 |
| JP | 2013-247757 A | 12/2013 |
| JP | 2016-208634 A | 12/2016 |

* cited by examiner

*Primary Examiner* — Suchin Parihar
(74) *Attorney, Agent, or Firm* — Dinsmore & Shohl LLP

(57) ABSTRACT

A first controller performs a process including: specifying a selection candidate for a charging stand when one of cables is connected to a vehicle; controlling a display unit to present a selection screen; specifying a selected number when a selection manipulation is performed; and outputting a charging control execution command to a charging stand corresponding to the selected number.

5 Claims, 7 Drawing Sheets

DISPLAY DEVICE FOR CHARGING SYSTEM AND DISPLAY METHOD FOR CHARGING SYSTEM

CROSS REFERENCE TO RELATED APPLICATIONS

This nonprovisional application claims priority to Japanese Patent Application No. 2019-038661 filed on Mar. 4, 2019, with the Japan Patent Office, the entire contents of which are hereby incorporated by reference.

BACKGROUND

Field

The present disclosure relates to presentation in a charging system that charges power storage devices mounted on a plurality of vehicles.

Description of the Background Art

Conventionally, there has been known an electrically powered vehicle having an onboard power storage device that can be charged with power supplied from an external power supply. The onboard power storage device of such an electrically powered vehicle is charged at a specific location such as a charging station, for example. In the charging station, a plurality of charging stands may be installed to charge power storage devices of a plurality of electrically powered vehicles.

For example, Japanese Patent Laying-Open No. 2016-208634 discloses a technique in which charging control is performed by controlling, via a communication unit, a plurality of charging stands connected to a plurality of vehicles so as to simultaneously charge power storage devices mounted on the vehicles. A high-ranked charging stand among the plurality of charging stands is provided with a manipulation unit such as a start button for starting charging, and can generally perform charging control for the vehicles connected to the respective charging stands, in accordance with a user's manipulation on the manipulation unit.

SUMMARY

However, if a user erroneously selects, from the plurality of charging stands, a charging stand different from an intended charging stand to perform the charging control, a power storage device mounted on the vehicle intended by the user cannot be charged, with the result that a power storage device mounted on a different vehicle may be charged.

An object of the present disclosure is to provide a display device for a charging system and a display method for the charging system so as to prevent a charging target from being erroneously selected in the charging system, the charging system being capable of charging power storage devices mounted on a plurality of vehicles.

A display device for a charging system according to a certain aspect of the present disclosure is a display device for a charging system, the charging system including: a plurality of power transfer units electrically connectable to a plurality of vehicles including power storage devices; and a charging device that supplies charging power to a power storage device of a vehicle via a power transfer unit connected to the vehicle among the plurality of power transfer units. The display device includes: a display unit that presents an image on a selection screen, the image indicating one of the plurality of power transfer units as a selection candidate for a power transfer unit via which supply of the charging power is to be started; and a controller that controls the display unit to present the selection screen when one of the plurality of power transfer units is connected to a vehicle. The controller controls the display unit to provide, on the selection screen, a manner of presentation in which among the plurality of power transfer units, a selection candidate for which the supply of the charging power is more likely to be started than other selection candidates is more emphasized visually than the other selection candidates.

In this way, the selection candidate more likely to start to supply the charging power than the other selection candidates is presented to be emphasized visually. Hence, the user can select an appropriate power transfer unit on the selection screen, whereby the power storage device mounted on the vehicle desired by the user can be charged while suppressing the user from making an error in selection.

In a certain embodiment, the controller controls the display unit to provide, on the selection screen, a manner of presentation in which among the plurality of power transfer units, a selection candidate for which power has become transferable between a vehicle and a corresponding power transfer unit at a most recent point of time is more emphasized visually than the other selection candidates.

In this way, from the selection screen, the user can readily specify a selection candidate representing a power transfer unit most recently connected to a vehicle. The power transfer unit most recently connected to the vehicle is highly likely to be a power transfer unit to start charging from now on. Hence, the user can select an appropriate power transfer unit on the selection screen, whereby the power storage device mounted on the vehicle desired by the user can be charged.

Further, in a certain embodiment, as the selection candidates, the controller does not present a power transfer unit that is supplying the charging power and a power transfer unit that has completed charging a connected power storage device among the plurality of power transfer units.

In this way, the power transfer unit that is supplying charging power and the power transfer unit that has completed charging the power storage device by supplying the charging power thereto are not presented as selection candidates among the plurality of power transfer units, whereby the user can be suppressed from erroneously selecting each of these power transfer units as a power transfer unit via which supply of charging power is to be started.

Further, in a certain embodiment, the charging device includes: a first charging stand connected to a first power transfer unit of the plurality of power transfer units; and a second charging stand connected to a second power transfer unit of the plurality of power transfer units. The display device is provided in the first charging stand. The first charging stand and the second charging stand are installed in respective parking spaces for the vehicles.

In this way, in the case where the plurality of charging stands are installed in the respective parking spaces for the vehicles, an appropriate power transfer unit can be selected from the selection screen presented on the display unit, whereby the power storage device mounted on the vehicle desired by the user can be charged.

A display method for a charging system according to another aspect of the present disclosure is a display method for a charging system, the charging system including: a plurality of power transfer units electrically connectable to a plurality of vehicles including power storage devices; and a charging device that supplies charging power to a power storage device of a vehicle via a power transfer unit connected to the vehicle among the plurality of power transfer units. The display method includes: presenting an image on a selection screen, the image indicating one of the plurality of power transfer units as a selection candidate for a power transfer unit via which supply of the charging power is to be started; presenting the selection screen when one of the plurality of power transfer units is connected to a vehicle; and providing, on the selection screen, a manner of presentation in which among the plurality of power transfer units, a selection candidate for which the supply of the charging power is more likely to be started than other selection candidates is more emphasized visually than the other selection candidates.

The foregoing and other objects, features, aspects and advantages of the present disclosure will become more apparent from the following detailed description of the present disclosure when taken in conjunction with the accompanying drawings.

DETAILED DESCRIPTION

Figure 1:
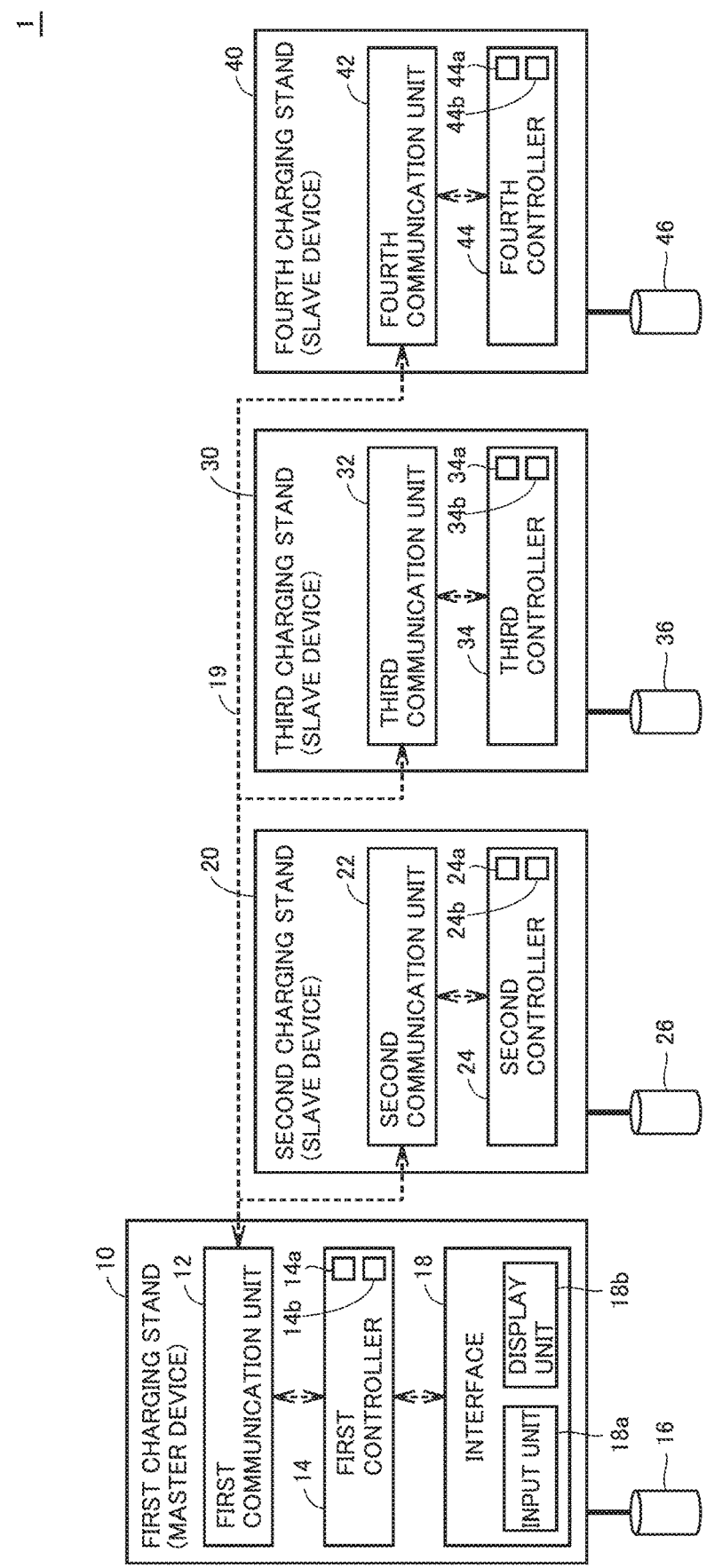
FIG. 1 schematically shows an exemplary entire configuration of a charging system in the present embodiment.

The following describes embodiments of the present disclosure with reference to figures in detail. It should be noted that the same or corresponding portions in the figures are given the same reference characters and are not described repeatedly.

FIG. 1 schematically shows an exemplary entire configuration of a charging system 1 in the present embodiment.

As shown in FIG. 1, charging system 1 according to the present embodiment includes a plurality of charging stands as a charging device. In the following description, it will be illustratively described that charging system 1 includes a first charging stand 10, a second charging stand 20, a third charging stand 30, and a fourth charging stand 40, for example; however, the number of the charging stands is not particularly limited to four.

First charging stand 10, second charging stand 20, third charging stand 30, and fourth charging stand 40 are installed in respective parking spaces for four vehicles, for example. When a vehicle is parked in one of these parking spaces, a power storage device mounted on the parked vehicle can be charged using a charging stand corresponding to the parking space in which the vehicle is parked. In the present embodiment, for example, each of the vehicles is an electrically powered vehicle including: an electric motor as a driving source; and a power storage device that supplies power to the electric motor. A detailed configuration of the electrically powered vehicle will be described later.

Only first charging stand 10 of first charging stand 10, second charging stand 20, third charging stand 30, and fourth charging stand 40 is provided with an interface that receives a manipulation from a user and that notifies predetermined information to the user. First charging stand 10 has a function as a master device that can output a charging control execution command to other charging stand(s) (at least one of second charging stand 20, third charging stand 30, and fourth charging stand 40). Each of second charging stand 20, third charging stand 30, and fourth charging stand 40 has a function as a slave device that can perform charging control in accordance with the charging control execution command from first charging stand 10.

First charging stand 10 is constituted of a first communication unit 12, a first controller 14, a first cable 16, and an interface 18.

First communication unit 12 is communicatively connected to each of below-described second communication unit 22, third communication unit 32, and fourth communication unit 42 via a communication line 19. In accordance with a control signal from first controller 14, first communication unit 12 transmits, to at least one of second communication unit 22, third communication unit 32, and fourth communication unit 42, a signal indicating predetermined information, and receives, from at least one of second communication unit 22, third communication unit 32, and fourth communication unit 42, a signal indicating predetermined information.

First controller 14 includes a CPU (Central Processing Unit) 14a, a memory 14b serving as a storage device, an input/output buffer (not shown), and the like. First controller 14 can perform charging control in first charging stand 10. Further, first controller 14 can individually output a charging control execution command to each of second charging stand 20, third charging stand 30, and fourth charging stand 40 via communication line 19. For example, first controller 14 sends a control signal to interface 18, or sends a control signal, such as a charging control execution command, to first communication unit 12. Further, first controller 14 receives a signal indicating predetermined information (for example, information about the user's manipulation) from interface 18, or receives a signal indicating predetermined information (for example, a signal indicating that a vehicle is connected to a cable) from first communication unit 12. First controller 14 performs a predetermined process by using CPU 14a to execute a program or the like stored in memory 14b.

First cable 16 includes: a power line via which power can be transferred; and a communication line via which communication can be made between a vehicle and first charging stand 10. One end of first cable 16 is connected to a power supply via a charging unit in first charging stand 10. The other end of first cable 16 is provided with a connector having a shape connectable to an inlet of a vehicle. When the connector of first cable 16 is connected to an inlet of a vehicle, the following states are attained: the charging power can be supplied from first charging stand 10 to the power storage device mounted on the vehicle via the power line; and communication can be performed between the vehicle and first charging stand 10 via the communication line.

When the connector of first cable 16 is connected to the vehicle and a predetermined signal is received from the vehicle via the communication line in first cable 16, first controller 14 sets, to the ON state, a flag indicating that the vehicle is connected to first charging stand 10.

Interface 18 includes an input unit 18a and a display unit 18b. Display unit 18b includes a display screen constituted of a liquid crystal display, an organic EL (Electro-Luminescence) display, or the like, for example. For example, in accordance with a control signal from first controller 14, display unit 18b presents, on the display screen, an image indicating predetermined information. For example, input unit 18a may be constituted of a touch panel (not shown) installed on the display screen of display unit 18b, or may be constituted of a manipulation member such as a button or a lever. A manipulation signal resulting from the user's manipulation on input unit 18a is sent to first controller 14. The display device of charging system 1 according to the present embodiment is constituted of first controller 14 and display unit 18b.

Second charging stand 20 is constituted of second communication unit 22, a second controller 24, and a second cable 26.

In accordance with a control signal from second controller 24, second communication unit 22 transmits, to at least one of first communication unit 12, third communication unit 32, and fourth communication unit 42, a signal indicating predetermined information, and receives, from at least one of first communication unit 12, third communication unit 32, and fourth communication unit 42, a signal indicating predetermined information.

Second controller 24 includes a CPU 24a, a memory 24b, an input/output buffer (not shown), and the like. Second controller 24 can perform the charging control in second charging stand 20. For example, in response to reception of a charging control execution command from first controller 14, second controller 24 performs charging control in second charging stand 20.

For example, second controller 24 sends a signal indicating predetermined information (for example, a signal indicating that the vehicle is connected to second cable 26) to first communication unit 12 via second communication unit 22. Second controller 24 performs a predetermined process by using CPU 24a to execute a program or the like stored in memory 24b.

Second cable 26 includes: a power line via which power can be transferred; and a communication line via which communication can be made between a vehicle and second charging stand 20. One end of second cable 26 is connected to a power supply via a charging unit in second charging stand 20. The other end of second cable 26 is provided with a connector having a shape connectable to an inlet of a vehicle. When the connector of second cable 26 is connected to an inlet of a vehicle, the following states are attained: the charging power can be supplied from second charging stand 20 to a power storage device mounted on the vehicle via the power line; and communication can be performed between the vehicle and second charging stand 20 via the communication line.

When the connector of second cable 26 is connected to the vehicle and a predetermined signal is received from the vehicle via the communication line in second cable 26, second controller 24 sends, to first communication unit 12 via second communication unit 22, a signal indicating that the vehicle is connected to second charging stand 20.

Third charging stand 30 is constituted of third communication unit 32, a third controller 34, and a third cable 36. Third controller 34 includes a CPU 34a and a memory 34b. Configurations of third communication unit 32, third controller 34, and third cable 36 are the same as the configurations of second communication unit 22, second controller 24, and second cable 26 respectively. Accordingly, detailed description thereof will not be repeated.

Fourth charging stand 40 is constituted of fourth communication unit 42, a fourth controller 44, and a fourth cable 46. Fourth controller 44 includes a CPU 44a and a memory 44b. Configurations of fourth communication unit 42, fourth controller 44, and fourth cable 46 are the same as the configurations of second communication unit 22, second controller 24, and second cable 26 respectively. Accordingly, detailed description thereof will not be repeated.

Figure 2:
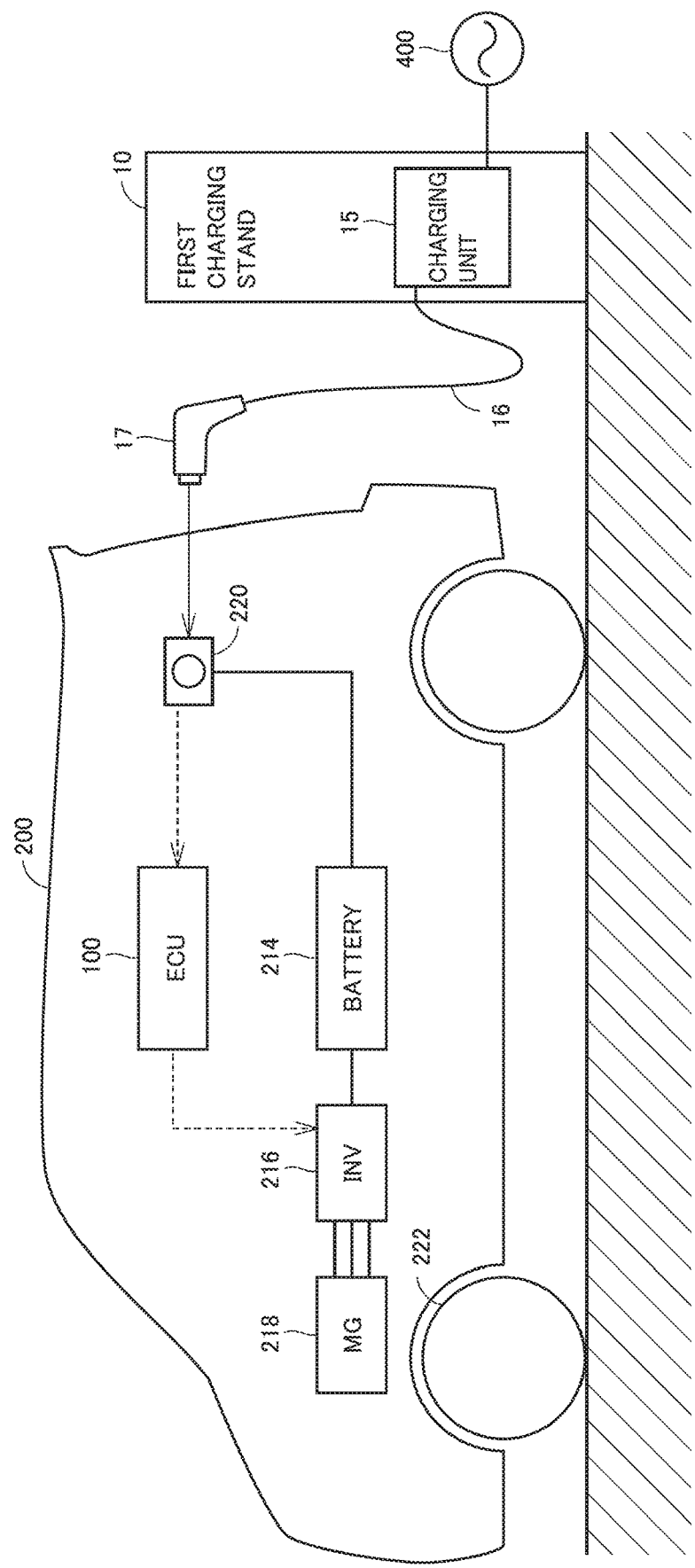
FIG. 2 shows an exemplary configuration of an electrically powered vehicle.

With reference to FIG. 2, the following describes an electrically powered vehicle including a power storage device to be charged by such a charging system 1. FIG. 2 shows an exemplary configuration of an electrically powered vehicle (hereinafter, referred to as "vehicle") 200. Examples of vehicle 200 includes electrically powered vehicles such as a plug-in hybrid vehicle and an electric vehicle. It should be noted that the configuration of vehicle 200 is not particularly limited to those of the electrically powered vehicles exemplified as above, as long as vehicle 200 has a configuration with which power supplied from charging system 1 can be received. For example, in FIG. 2, the following case is assumed: vehicle 200 is parked in the parking space corresponding to first charging stand 10.

As shown in FIG. 2, vehicle 200 includes an ECU (Electronic Control Unit) 100, a battery 214, an inverter 216, a motor generator 218, and an inlet 220.

Battery 214 is a rechargeable power storage element, for example. Representatively, a secondary battery, such as a nickel-metal hydride battery or a lithium ion battery, is applied thereto. Alternatively, battery 214 may be any power storage device capable of storing power, and a large-capacity capacitor may be used instead of battery 214, for example.

Inverter 216 is a power conversion device that converts power between AC power and DC power. Inverter 216 is controlled in accordance with a control signal from ECU 100. Inverter 216 may convert DC power of battery 214 into AC power and supply it to motor generator 218, for example. Further, inverter 216 may receive AC power (regenerative power) from motor generator 218, convert it into DC power, and supply it to battery 214 to charge battery 214, for example.

Motor generator 218 receives power supplied from inverter 216 and provides rotational force to a drive wheel 222. Drive wheel 222 is rotated by the rotational force provided by motor generator 218 to drive vehicle 200.

Inlet 220 is provided in vehicle 200 at an exterior portion of vehicle 200 together with a cover (not shown) such as a lid. Inlet 220 is a power receiving unit that receives supply of charging power from first charging stand 10. Inlet 220 has such a shape that connector 17 provided at the end portion of first cable 16 can be attached. Inlet 220 and connector 17 both have contacts, respectively, incorporated therein, and when connector 17 is attached to inlet 220, the contacts come into contact with each other, and inlet 220 and connector 17 are thus electrically connected together. On this occasion, battery 214 of vehicle 200 is brought into a state in which battery 214 can be charged using power supplied from first charging stand 10.

First charging stand 10 further includes a charging unit 15 electrically connected to a power supply 400. Charging unit 15 converts power (for example, AC power) of power supply 400 into power (for example, DC power) suitable for charging of battery 214. Charging unit 15 is operated in accordance with a control signal from first controller 14 described above. Power supply 400 is constituted of a commercial power supply, for example.

ECU 100 includes a CPU and a memory (not shown), and controls each device (for example, inverter 216) of vehicle 200 based on information stored in the memory or information from various sensors. It should be noted that they can be controlled by not only a process performed by software but also a process performed by dedicated hardware (electronic circuit) constructed therefor.

Further, when connector 17 is connected to inlet 220, ECU 100 can communicate with first controller 14 via first cable 16. For example, ECU 100 sends, to first controller 14, a signal indicating that first cable 16 is connected to vehicle 200, information regarding battery 214 (such as voltage information, or information of SOC), and the like. During execution of the charging control, first controller 14 operates charging unit 15 using information received from vehicle 200, and charges battery 214 until the SOC of battery 214 reaches a predetermined SOC (an SOC corresponding to a fully charged state).

In charging system 1 having the above configuration, if a user erroneously selects, from first charging stand 10 to fourth charging stand 40, a charging stand different from an intended charging stand (charging stand corresponding to a parking space in which a vehicle of the user is parked) to perform charging control, a power storage device mounted on the vehicle intended by the user cannot be charged, with the result that a power storage device mounted on a different vehicle may be charged.

To address this, in the present embodiment, first controller 14 of first charging stand 10 operates as follows. Specifically, when one of first cable 16, second cable 26, third cable 36, and fourth cable 46 is connected to vehicle 200, first controller 14 controls display unit 18b to present a selection screen. On the selection screen, first controller 14 presents, as a selection candidate, a cable via which supply of charging power is to be started. First controller 14 controls display unit 18b to provide, on the selection screen, a manner of presentation in which among the plurality of cables, a selection candidate for which the supply of the charging power is more likely to be started than other selection candidates is more emphasized visually than the other selection candidates. When the user's manipulation for selecting a selection candidate presented on the selection screen is received in input unit 18a, first controller 14 outputs, to a charging stand having a cable corresponding to the selected selection candidate, an execution command for performing charging control.

In this way, since the selection candidate for which the supply of the charging power is more likely to be started than the other selection candidates is presented to be more emphasized visually than the other selection candidates, the user can select an appropriate charging stand on the selection screen, with the result that the battery mounted on the vehicle intended by the user can be charged while suppressing the user from making an error in selection.

Figure 3:
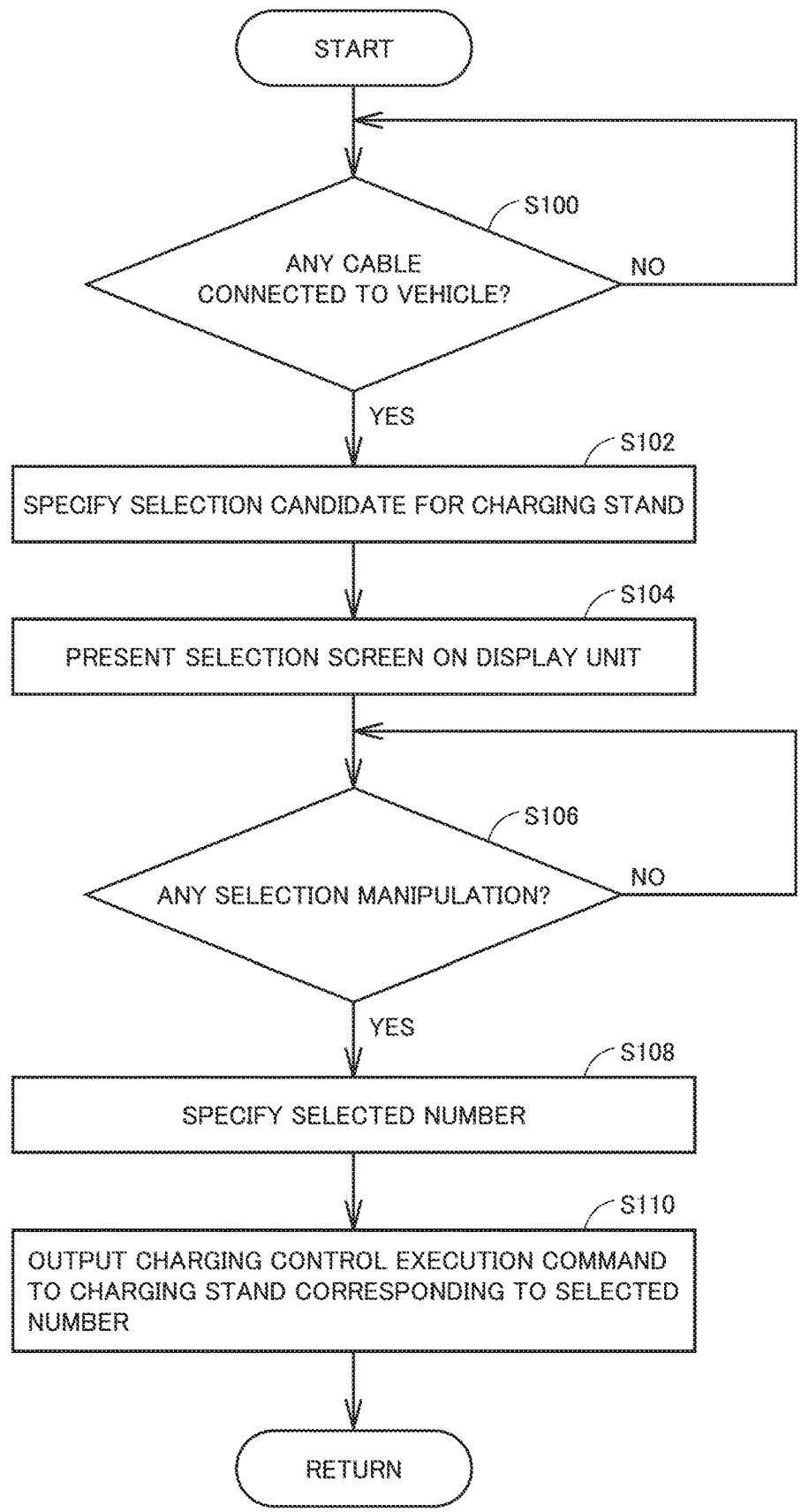
FIG. 3 is a flowchart showing an exemplary process performed by a first controller.

With reference to FIG. 3, the following describes a process performed by first controller 14 in the present embodiment. FIG. 3 is a flowchart showing an exemplary process performed by first controller 14. Each of steps included in the flowchart is basically implemented by a software process by first controller 14; however, a part or whole of the process may be implemented by hardware (electric circuit) fabricated in first controller 14.

In a step (hereinafter, the term "step" will be abbreviated as "S") 100, first controller 14 determines whether or not one of first cable 16, second cable 26, third cable 36, and fourth cable 46 is connected to a vehicle. For example, first controller 14 determines that one of first cable 16, second cable 26, third cable 36, and fourth cable 46 is connected to a vehicle in the following case: a case where a flag indicating that a vehicle is connected to first charging stand 10 is in the ON state; a case where a signal indicating that second cable 26 is connected to a vehicle is received from second charging stand 20; a case where a signal indicating that third cable 36 is connected to a vehicle is received from third charging stand 30; or a case where a signal indicating that fourth cable 46 is connected to a vehicle is received from fourth charging stand 40. When it is determined that at least one of first cable 16, second cable 26, third cable 36, and fourth cable 46 is connected to a vehicle (YES in S100), the process proceeds to S102.

In S102, first controller 14 specifies a charging stand serving as a selection candidate. For example, when it is determined that first cable 16 is connected to a vehicle, first controller 14 specifies first charging stand 10 as a selection candidate. For example, when it is determined that second cable 26 is connected to a vehicle, first controller 14 specifies second charging stand 20 as a selection candidate. For example, when it is determined that third cable 36 is connected to a vehicle, first controller 14 specifies third charging stand 30 as a selection candidate. Alternatively, for example, when it is determined that fourth cable 46 is connected to a vehicle, first controller 14 specifies fourth charging stand 40 as a selection candidate.

In S104, first controller 14 presents a selection screen on display unit 18b of interface 18. First controller 14 presents an image indicating the selection candidate on the selection screen.

For example, when first charging stand 10 is presented as a selection candidate, at a predetermined position (for example, an upper left position) of the selection screen, first controller 14 presents an image constituted of: a presentation frame having a predetermined shape (for example, a rectangular shape); and a number "1" indicating first charging stand 10 and positioned within the presentation frame.

For example, when second charging stand 20 is presented as a selection candidate, at a predetermined position (for example, an upper right position) of the selection screen, first controller 14 presents an image constituted of: a presentation frame having a predetermined shape; and a number "2" indicating second charging stand 20 and positioned within the presentation frame.

For example, when third charging stand 30 is presented as a selection candidate, at a predetermined position (for example, a lower left position) of the selection screen, first controller 14 presents an image constituted of: a presentation frame having a predetermined shape; and a number "3" indicating third charging stand 30 and positioned within the presentation frame.

For example, when fourth charging stand 40 is presented as a selection candidate, at a predetermined position (for example, a lower right position) of the selection screen, first controller 14 presents an image constituted of: a presentation frame having a predetermined shape; and a number "4" indicating fourth charging stand 40 and positioned within the presentation frame.

Further, among the selection candidates presented on the selection screen, first controller 14 controls display unit 18b to present a selection candidate for which supply of the charging power is more likely to be started, in a manner of presentation in which the selection candidate is presented to be more emphasized visually than the other selection candidates.

In the present embodiment, for example, first controller 14 controls display unit 18b to provide, on the selection screen, a manner of presentation in which among a plurality of selection candidates, a selection candidate for which a cable is connected to a vehicle at a most recent point of time is more emphasized visually than the other selection candidates.

For example, first controller 14 assumes, as the most recent selection candidate, the selection candidate specified in S102, and presents a background color in a presentation frame indicating the selection candidate to be darker than those of the other selection candidates, thus resulting in the manner of presentation in which the selection candidate is more emphasized visually than the other selection candidates. It should be noted that first controller 14 stores a time of connection of a cable to a vehicle whenever the cable is connected thereto, and presents a selection candidate most recent in terms of the time of connection among the plurality of selection candidates in a manner of presentation in which the selection candidate is more emphasized visually than the other selection candidates.

In S106, first controller 14 determines whether or not a selection manipulation is performed. For example, first controller 14 determines that the selection manipulation is performed when a manipulation for selecting one of numbers "1" to "4" presented on the selection screen is performed onto input unit 18a. For example, in the case where input unit 18a is a touch panel, first controller 14 determines that the selection manipulation is performed when coordinates indicating a touched position on the touch panel are coordinates within a region of each of the images indicating the numbers "1" to "4" presented on the selection screen. When it is determined that the selection manipulation is performed (YES in S106), the process proceeds to S108.

In S108, first controller 14 specifies a number (hereinafter, referred to as "selected number") selected by the selection manipulation. First controller 14 uses a manipulation history for input manipulations to specify the number selected by the selection manipulation, for example. For example, in the case where input unit 18a is a touch panel, first controller 14 specifies the selected number in accordance with which one of the regions of the images indicating the numbers "1" to "4" presented on the selection screen the coordinates indicating the touched position on the touch panel fall within.

In S110, first controller 14 outputs, as a control signal, a charging control execution command to the charging stand corresponding to the specified selected number.

Figure 4:
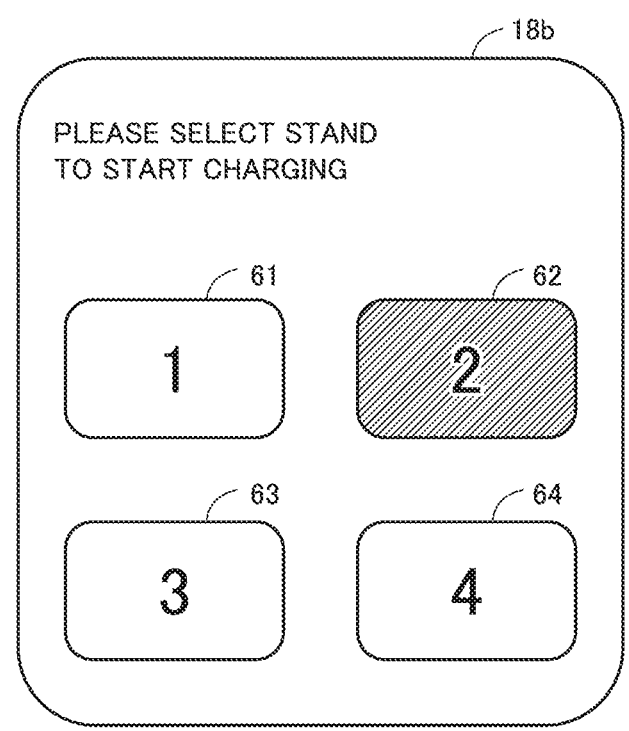
FIG. 4 shows an exemplary configuration of a selection screen.

With reference to FIG. 4, the following describes an operation of first controller 14 based on the above-described structure and flowchart. FIG. 4 shows an exemplary configuration of the selection screen.

For example, the following case is assumed: a user parks a vehicle in the parking space in which second charging stand 20 is provided, so as to charge the vehicle. It should be noted that vehicles are also parked at first charging stand 10, third charging stand 30, and fourth charging stand 40, and the respective cables of the charging stands are already connected to the vehicles.

When second cable 26 is connected to the vehicle (YES in S100), second charging stand 20 is specified as a selection candidate (S102).

On this occasion, such a selection screen as shown in FIG. 4 is presented on display unit 18b of interface 18 provided in first charging stand 10 (S104).

That is, since the respective cables of the charging stands are connected to the vehicles, images 61, 62, 63, 64 indicating the numbers "1" to "4" positioned in the predetermined presentation frames are presented on the selection screen presented on display unit 18b as selection candidates.

In image 62, the background color of the presentation frame of the number "2" specified as the most recent selection candidate is presented to be darker than the background colors of the presentation frames of the other numbers. Accordingly, the selection candidate corresponding to the number "2" specified as the most recent selection candidate is presented to be more emphasized visually than the other selection candidates. It should be noted that FIG. 4 illustratively shows that the background colors of the presentation frames of images 61, 63, 64 respectively corresponding to the numbers "1", "3", and "4" are white.

When the user performs a selection manipulation for selecting image 62 indicating the number "2" on the selection screen (YES in S106) and the selected number is specified to be "2" (S108), a charging control execution command is output to second charging stand 20 corresponding to the specified selected number "2" (S110).

In accordance with the charging control execution command from first charging stand 10, second charging stand 20 starts to supply charging power to the battery mounted on the vehicle connected to second cable 26. Accordingly, the battery mounted on the vehicle connected to second cable 26 is charged.

As described above, according to the display device for charging system 1 according to the present embodiment, among the plurality of selection candidates, the selection candidate for which the charging power has become suppliable at a most recent point of time due to the cable being connected to the vehicle is presented to be more emphasized visually than the other selection candidates on the selection screen. Accordingly, the selection candidate highly likely to start to supply the charging power is presented to be emphasized visually. Hence, the user can select an appropriate charging stand on the selection screen, whereby the battery mounted on the vehicle desired by the user can be charged while suppressing the user from making an error in selection. Therefore, it is possible to provide a display device for a charging system and a display method for the charging system so as to prevent a charging target from being erroneously selected in the charging system, the charging system being capable of charging power storage devices mounted on a plurality of vehicles.

Hereinafter, a modification will be described.

In the above-described embodiment, it has been illustratively described that when connector 17 is connected to inlet 220, external charging is performed through contact charging in which the cable serves as the power transfer unit; however, the external charging may be performed through non-contact charging in which a power receiving unit included at the vehicle side and a power transmission unit included at the charging stand side serve as the power transfer unit. In the case of the non-contact charging, the expression "connected to the vehicle" means pairing of the power transmission unit and the power receiving unit at the vehicle side. When a plurality of power transmission units are included in the charging stand, the "pairing" includes a process for specifying to which one of the power transmission units the power receiving unit is aligned. As a pairing method, various methods have been well-known and an appropriate method can be employed.

Further, in the above-described embodiment, it has been described that the charging stands with their cables connected to the vehicle are presented on the selection screen as selection candidates; however, only the most recent selection candidate may be presented on the selection screen. In this way, the selection candidate highly likely to start to supply charging power is presented to be emphasized visually. Hence, the user can select an appropriate charging stand on the selection screen, whereby the battery mounted on the vehicle desired by the user can be charged while suppressing the user from making an error in selection. Alternatively, only the most recent selection candidate may be presented on the selection screen until a predetermined period of time passes.

Further, in the above-described embodiment, it has been described that the charging stands with their cables connected to the vehicles are presented on the selection screen as selection candidates; however, a charging stand that is being supplying charging power, and a charging stand that has completed charging a battery of a vehicle to which its cable is connected may not be presented as selection candidates among the charging stands with the their cables connected to the vehicles.

For example, when presenting the selection screen, first controller 14 may not present, as a selection candidate, a charging stand corresponding to a flag that is in the ON state among first to fourth flags. The first flag is brought into the ON state when the charging power is started to be supplied in first charging stand 10. The second flag is brought into the ON state when information indicating that the charging power is started to be supplied in second charging stand 20 is received from second charging stand 20. The third flag is brought into the ON state when information indicating that the charging power is started to be supplied in third charging stand 30 is received from third charging stand 30. The fourth flag is brought into the ON state when information indicating that the charging power is started to be supplied in fourth charging stand 40 is received from fourth charging stand 40. It should be noted that when the cable connected to the vehicle is removed, first controller 14 sets, to the OFF state, the flag corresponding to the charging stand from which the cable is removed. For example, such a process can be implemented by presenting, as a selection candidate, a charging stand other than a charging stand corresponding to a flag that is in the ON state among the first to fourth flags in the process of S104 in the flowchart of FIG. 3.

In this way, the user can be suppressed from erroneously selecting, as a charging stand from which supply of charging power is to be started, a charging stand that is being supplying the charging power or a charging stand that has completed charging.

Further, in the above-described embodiment, it has been described that the selection candidate for which the charging power has become suppliable at the most recent point of time due to the cable being connected to the vehicle is presented to be more emphasized visually than the other selection candidates on the selection screen; however, when a selection candidate other than the selection candidate presented to be emphasized visually is selected by the user on the selection screen, before a charging control execution command is output to the charging stand corresponding to the selected selection candidate, the user may be requested to confirm whether to output the charging control execution command.

Figure 5:
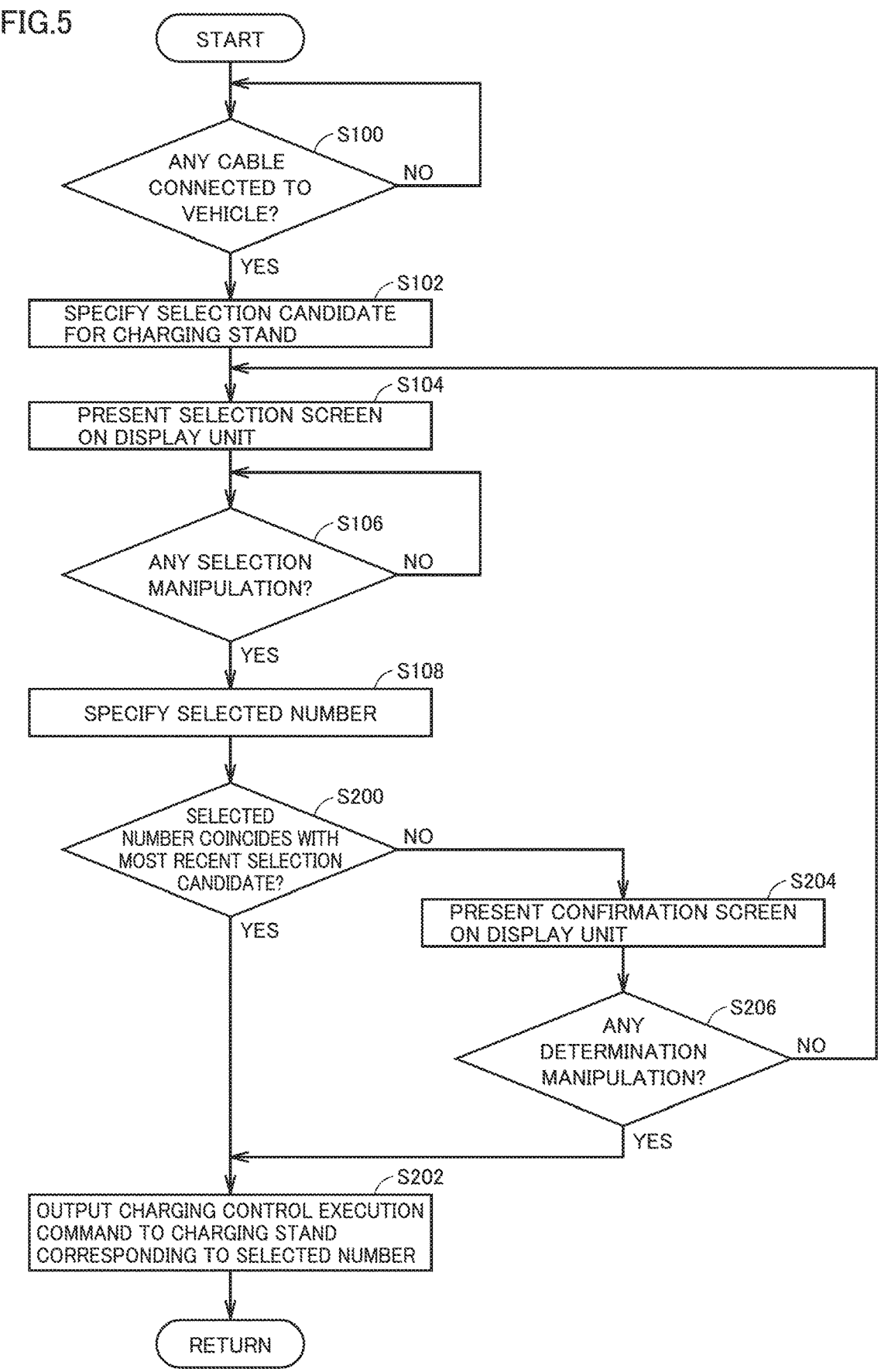
FIG. 5 is a flowchart showing an exemplary process performed by the first controller in a modification.

The following describes a process performed by first controller 14 in this modification with reference to FIG. 5. FIG. 5 is a flowchart showing an exemplary process performed by first controller 14 in the modification.

It should be noted that processes of S100, S102, S104, S106, and S108 in the flowchart of FIG. 5 are respectively the same as the processes of S100, S102, S104, S106, and S108 in the flowchart of FIG. 3. Accordingly, detailed description thereof will not be repeated.

When the selected number is specified in S108, first controller 14 determines in S200 whether or not the selected number coincides with the most recent selection candidate. When it is determined that the selected number coincides with the most recent selection candidate (YES in S200), the process proceeds to S202.

In S202, first controller 14 outputs a charging control execution command to the charging stand corresponding to the specified selected number. On the other hand, when it is determined that the selected number does not coincide with the most recent selection candidate (NO in S200), the process proceeds to S204.

In S204, first controller 14 presents a confirmation screen on display unit 18b. For example, on display unit 18b, first controller 14 presents the selected number, and the confirmation screen including: text information including a content for requesting to confirm whether or not the selected number is correct; an image including text information indicating "YES"; and an image including text information indicating "NO".

In S206, first controller 14 determines whether or not a determination manipulation is performed. For example, first controller 14 determines that the determination manipulation is performed when a manipulation onto input unit 18a is a manipulation for selecting the image including the text information indicating "YES" presented on the confirmation screen. When it is determined that the determination manipulation is performed (YES in S206), the process proceeds to S202. On the other hand, when the manipulation onto input unit 18a is a manipulation for selecting the image including the text information indicating "NO" presented on the confirmation screen, it is determined that no determination manipulation is performed. When it is determined that no determination manipulation is performed (NO in S206), the process is returned to S104.

Figure 6:
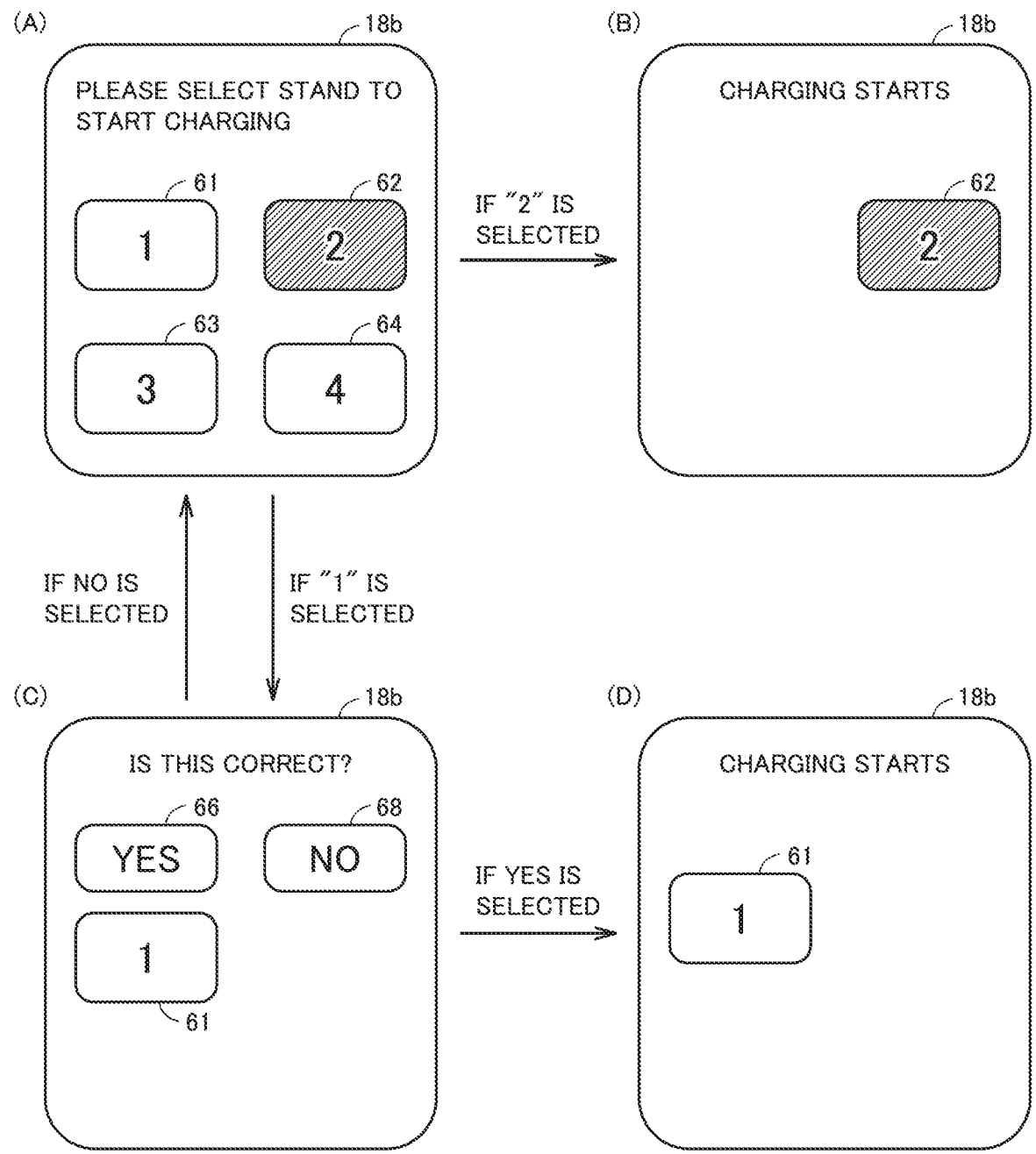
FIG. 6 illustrates an operation of the first controller in the modification.

FIG. 6 illustrates an operation of first controller 14 in the modification. For example, the following case is assumed: a user parks a vehicle in the parking space in which second charging stand 20 is provided, so as to charge the vehicle. It should be noted that vehicles are also parked at first charging stand 10, third charging stand 30, and fourth charging stand 40, and the respective cables of the charging stands are connected to the vehicles.

When second cable 26 is connected to the vehicle (YES in S100), second charging stand 20 is specified as a selection candidate (S102).

On this occasion, such a selection screen as shown in FIG. 6 (A) is presented on display unit 18b of interface 18 provided at first charging stand 10 (S104). It should be noted that the configuration of the selection screen shown in FIG. 6 (A) is the same as the configuration of the selection screen shown in FIG. 4.

That is, since the respective cables of the charging stands are connected to the vehicles, images 61, 62, 63, 64 indicating the numbers "1" to "4" positioned in predetermined presentation frames as selection candidates are presented on the selection screen. In image 62, the background color of the presentation frame of the number "2" specified as the most recent selection candidate is presented to be darker than the background colors of the presentation frames of the other numbers. Accordingly, the selection candidate corresponding to the number "2" specified as the most recent selection candidate is presented to be more emphasized visually than the other selection candidates.

When the user performs a selection manipulation for selecting the number "2" on the selection screen (YES in S106) and the selected number is specified to be "2" (S108), the most recent selection candidate and the selected number coincide with each other (YES in S200), with the result that a charging control execution command is output to second charging stand 20 corresponding to the selected number "2" (S202). It should be noted that on this occasion, image 62 indicating the number "2" is presented on the display screen of display unit 18*b* and the other selection candidates may not be presented as shown in FIG. 6 (B).

On the other hand, when the user performs a selection manipulation for selecting image 61 indicating the number "1" on the selection screen (YES in S106) and the selected number is specified to be "1" (S108), the most recent selection candidate and the selected number do not coincide with each other (NO in S200), with the result that a confirmation screen is presented on display unit 18*b* (S204).

As shown in FIG. 6 (C), on the confirmation screen, there are presented: image 61 indicating the selected number "1"; text information including a content for requesting to confirm whether or not the selected number is correct; an image 66 including text information indicating "YES"; and an image 68 including text information indicating "NO".

Here, when the user performs a manipulation for selecting "NO" on the confirmation screen, no determination manipulation is performed (NO in S206), with the result that the selection screen shown in FIG. 6 (A) is presented again (S104).

On the other hand, when the user performs a manipulation for selecting "YES" on the confirmation screen, it is determined that the determination manipulation is performed (YES in S206), with the result that a charging control execution command is output to first charging stand 10 corresponding to the selected number "1" (S202). On this occasion, text information indicating that charging is to be started and image 61 indicating the number "1" may be presented on the display screen of display unit 18*b* as shown in FIG. 6 (D).

Also in this way, the user can select an appropriate charging stand on the selection screen, whereby the battery mounted on the vehicle desired by the user can be charged while suppressing the user from making an error in selection.

Figure 7:
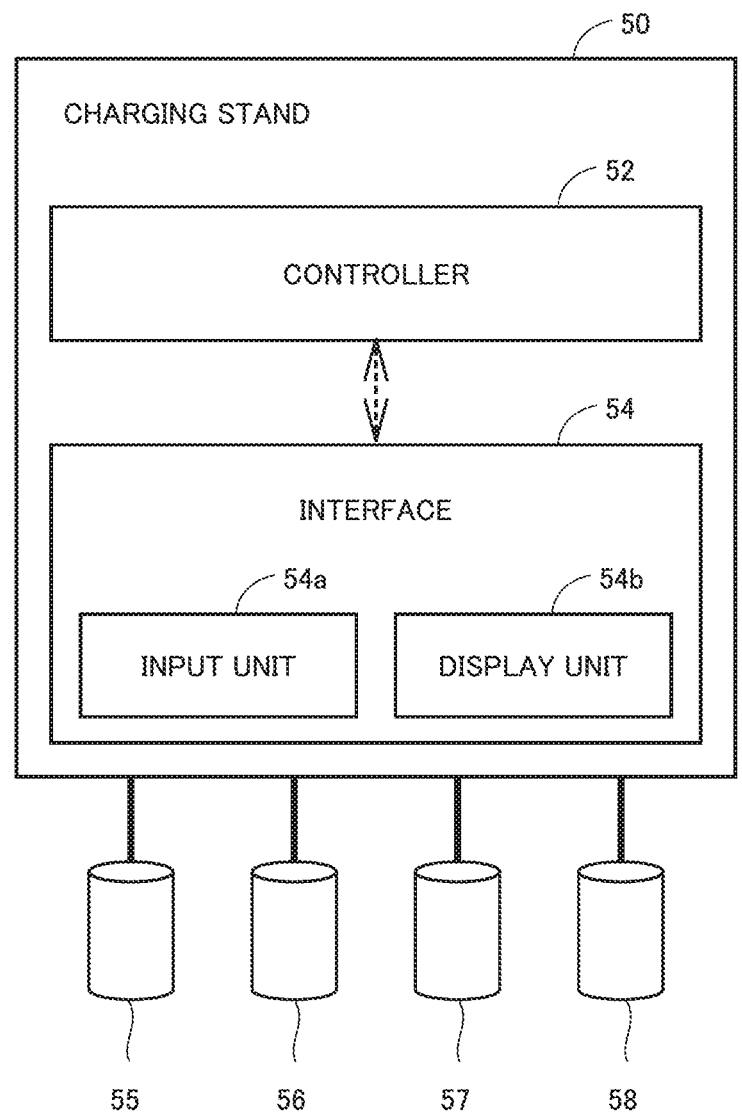
FIG. 7 schematically shows an exemplary entire configuration of the charging system in the modification.

Further, in the above-described embodiment, the configuration in which the charging stands are installed in the respective parking spaces has been described as a premise; however, the charging stands may be integrated into one charging stand, and the charging stand may be installed such that a plurality of cables extends from the charging stand to be connectable to vehicles parked in the respective parking spaces. FIG. 7 schematically shows an exemplary configuration of the charging system in the modification. As shown in FIG. 7, the charging system in this modification includes a charging stand 50 including a controller 52, an interface 54, a first cable 55, a second cable 56, a third cable 57, and a fourth cable 58. One end of each of first cable 55, second cable 56, third cable 57, and fourth cable 58 is connected to a charging unit (not shown) in charging stand 50, and the other end of each of first cable 55, second cable 56, third cable 57, and fourth cable 58 is provided with a connector having a shape connectable to an inlet of a vehicle.

Interface 54 includes an input unit 54*a* and a display unit 54*b*. The configuration of interface 54 is the same as the configuration of interface 18. Accordingly, detailed description thereof will not be repeated.

For example, controller 52 presents at least one of first cable 55, second cable 56, third cable 57, and fourth cable 58 on display unit 54*b* as a selection candidate for a charging target, and performs charging control for a battery mounted on a vehicle connected to a cable corresponding to the selection candidate selected by input unit 54*a*.

In the charging system having such a configuration, for example, when first cable 55 is connected to the vehicle and first cable 55 is specified as the most recent selection candidate, an image indicating the number "1" corresponding to the most recent selection candidate is presented to be more emphasized visually than the other selection candidates, whereby the battery mounted on the vehicle desired by the user can be charged while suppressing the user from making an error in selection.

It should be noted that the above modifications may be implemented all together or may partially be implemented appropriately in combination.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A display device for a charging system,
the charging system including
a plurality of power transfer units electrically connectable to a plurality of vehicles including power storage devices, and
a charging device that supplies charging power to a power storage device of a vehicle via a power transfer unit connected to the vehicle among the plurality of power transfer units,
the display device comprising:
a display unit that presents an image on a selection screen, the image indicating one of the plurality of power transfer units as a selection candidate for a power transfer unit via which supply of the charging power is to be started; and
a controller that controls the display unit to present the selection screen when one of the plurality of power transfer units is connected to a vehicle, wherein
the controller controls the display unit to provide, on the selection screen, a manner of presentation in which among the plurality of power transfer units, a selection candidate for which the supply of the charging power is more likely to be started than other selection candidates is more emphasized visually than the other selection candidates.

2. The display device for the charging system according to claim 1, wherein the controller controls the display unit to provide, on the selection screen, a manner of presentation in which among the plurality of power transfer units, a selection candidate for which power has become transferable between a vehicle and a corresponding power transfer unit at a most recent point of time is more emphasized visually than the other selection candidates.

3. The display device for the charging system according to claim 1, wherein as the selection candidates, the controller does not present a power transfer unit that is supplying the charging power and a power transfer unit that has completed charging a connected power storage device among the plurality of power transfer units.

4. The display device for the charging system according to claim 1, wherein
the charging device includes
a first charging stand connected to a first power transfer unit of the plurality of power transfer units, and
a second charging stand connected to a second power transfer unit of the plurality of power transfer units, the display device is provided in the first charging stand, and the first charging stand and the second charging stand are installed in respective parking spaces for the vehicles.

5. A display method for a charging system, the charging system including a plurality of power transfer units electrically connectable to a plurality of vehicles including power storage devices, and a charging device that supplies charging power to a power storage device of a vehicle via a power transfer unit connected to the vehicle among the plurality of power transfer units, the display method comprising:

presenting an image on a selection screen, the image indicating one of the plurality of power transfer units as a selection candidate for a power transfer unit via which supply of the charging power is to be started;

presenting the selection screen when one of the plurality of power transfer units is connected to a vehicle; and providing, on the selection screen, a manner of presentation in which among the plurality of power transfer units, a selection candidate for which the supply of the charging power is more likely to be started than other selection candidates is more emphasized visually than the other selection candidates.

* * * * *